United States Patent Office.

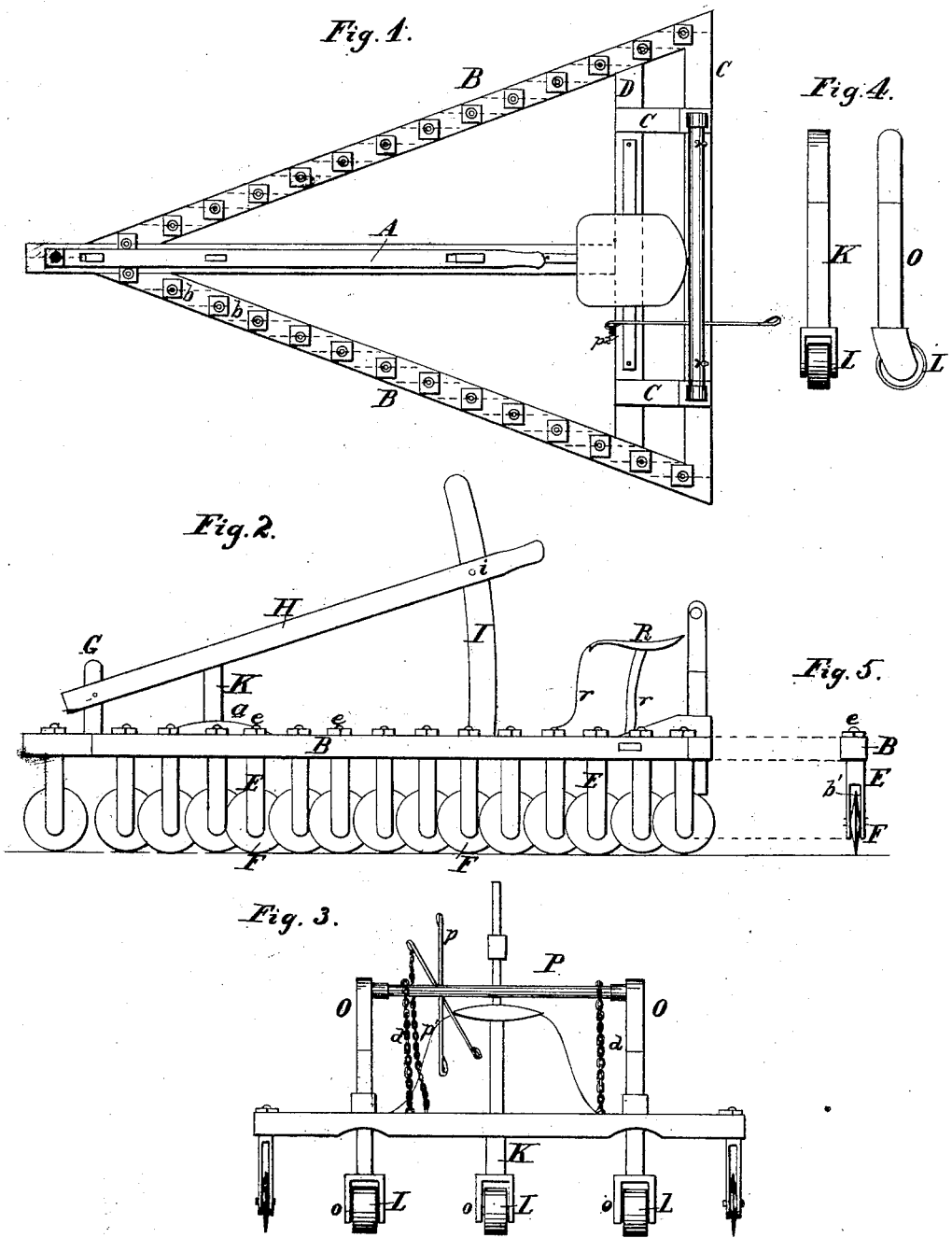

ELISHA CRANE, OF ELKHART CITY, ILLINOIS.

Letters Patent No. 73,876, dated January 28, 1868.

IMPROVEMENT IN DEVICES FOR SCARIFYING THE SOIL PREPARATORY TO PLOUGHING.

*The Schedule referred to in these Letters Patent and making part of the same.*

TO ALL WHOM IT MAY CONCERN:

Be it known that I, ELISHA CRANE, of Elkhart City, in the county of Logan, and State of Illinois, hav invented certain new and useful Improvements in a Device or Cutter for Scarifying Soil Preparatory to Plough ing; and I do hereby declare that the following is a full, clear, and exact description of the same, reference being had to the annexed drawings, and to the letters of reference marked thereon, making part of this speci fication, in which—

Figure 1 is a plan view.
Figure 2 is a side view.
Figure 3 is a rear end view.
Figure 4 is a side and end view of the uprights and wheels for transporting the machine and regulating the depth of cut.
Figure 5 is an end view, showing the slotted shank and cutting-blades attached.

The object of my invention is to furnish the farmer an agricultural implement that will enable him to suc cessfully surmount the series of difficulties incident to the "breaking up" of new and uncultivated ground, and especially to aid him in ploughing the prairie and other like soils. All who are at all familiar with the western prairies are acquainted with the great difficulty experienced in preparing the soil for the crop. The grass is long and very thick, which produces a close and densely-matted sod, and one that no ordinary plough can prop erly "crumble" to receive the crop. The plough will turn the sod, as it were, in sheets, and the grass has such a remarkable vitality that it will not rot the first season after ploughing, and any seed that is sown will be so protected from the action of heat and moisture as to materially interfere with its growth, and not unfrequently the seed is entirely destroyed.

Many efforts have been made to overcome this great difficulty, which is always experienced in cultivating the prairie soil. Ploughs are used with cutting-disks or blades attached, but this method only partially insures the result desired. Some have attempted to properly cut the sod by harrowing before ploughing, but repeated trials have proven that this plan is no more effective than the cutter-plough.

My invention has been practically tested, and I am thoroughly convinced that all the difficulties hereto fore encountered can be readily surmounted simply by passing my improved implement over the field or prairie before ploughing.

The nature of my invention consists in attaching to a suitable frame, by means of slotted shanks, a series or gang of cutting-disks, so arranged that they will cut the sod in parallel lines, and of a depth sufficient to render the subsequent task of properly ploughing simple and easy.

My invention also consists in providing a suitable and practical means, through the agency of a windlass and slotted lever, whereby the depth of cut can readily be regulated, and, when desired, for the purpose of transportation, the cutters can be so elevated as to pass entirely free of the ground.

To enable others skilled in the art to make and use my invention, I will proceed to describe its construction and operation.

The frame closely resembles in form and general construction the triangular harrow-frame now in common use. A is the centre beam. To this centre beam, near its front end, are the forward ends of the wing-beams B B. The rear ends of the wing-beams B B are firmly secured to a beam, C. Immediately in front of the beam C is a cross-beam, D. This cross-timber D is firmly mortised into the wing-beams B B, and near its centre furnishes a bearing for the beam A, which is firmly secured thereto. In the forward end of the beam A, and immediately in rear of the point where the clevis is attached, is an aperture or hole, b, and also, along the entire length of the beams B B, are apertures or openings, b b. In an ordinary machine, say twelve feet by eight feet, these holes, b b, are arranged about eight inches apart. Through each one of these holes I pass a screw-headed slotted shank, E. These shanks E E are firmly secured to the beams A B, by means of nuts, e e. When the desired cut of the disk is ascertained the nuts e e are securely tightened, which insures the direct and uniform action of the cutters. These shanks E E are all slotted, as shown at f f. In these slots f f I insert and securely fasten revolving circular blades or disks, F F. These cutters or disks are from ten inches to a foot in diameter, and are so arranged that each blade will project about two inches over the edge of the blade immediately in front. The blades thus arranged will, in passing over the soil, leave a series of parallel cuts, distanced about three and one-half inches from each other. At the front of the beam A, and near its point of contact with the wing-beams B B, I secure a standard, G. To this standard G there is pivoted a lever H. This lever H is slotted at the rear end, and works on a perforated curved arm, I. To this lever H, I firmly bolt the upright lever K. This lever K passes through the beam in the centre of its upward curve $a$, and may have its lower portion encased in metal. At the end of this lever H, I firmly attach a slotted swivel-bearing plate, K. In the slot I firmly secure the wheel L. To the beams C D, I attach the boss-bearing timbers $c\ c$. These bosses are slotted, as is also the beam C. Through these slots work the uprights O O, which are connected at their upper ends by the windlass-roller P. This windlass-roller is operated by handles $p\ p$. At the lower end of these uprights O O, I attach swivel-bearing plates $o\ o$. In these slots I firmly secure wheels L L. $d\ d$ are two chains, which are firmly secured to the roller P, and to the beam C. $p^1$ is a check-chain attached to the handle $p$. R is a driver's seat, which is supported by suitable standards, $r\ r$.

The operation is as follows: The lever H is pressed down in the curved arm I, until the cutters are elevated so as to clear the ground. A pin, $i$, is then inserted, which retains the lever in position. The windlass-roller P is then revolved, which winds the chains $p\ p$. This is continued until the rear of the frame is elevated, so as to allow the cutter to clear the ground. The check-chain $p^1$ is then fastened over the catch $p^2$. The implement is then, by means of the wheels L L L, conveyed to the field, when the pin $i$ and check-chain $p^2$ are unfastened, so as to let the cutters fall to the ground. The mechanism by which I elevate the frame, as just described, allows me to readily regulate the depth of cut.

Having thus fully described my invention, and its operation, what I claim as new therein, and desire to secure by Letters Patent of the United States, is—

1. Arranging in a suitable frame a series or gang of cutting-blades or disks, when the same are so adjusted as to cut the soil in parallel channels, substantially as described and for the purpose specified.

2. The lever H and curved arm I, in combination with the windlass-frame, when the same are arranged substantially as described and for the purpose specified.

In testimony whereof, I have signed my name to this specification in the presence of two subscribing witnesses.

ELISHA CRANE.

Witnesses:
  JOHN D. BLOOR,
  EDWIN JAMES.